United States Patent
Botero Halblaub et al.

(10) Patent No.: US 12,190,162 B2
(45) Date of Patent: Jan. 7, 2025

(54) OPTIMIZED ALLOCATION OF RESOURCES TO NODES OF AN AUTOMATION SYSTEM BASED ON MONTE CARLO SIMULATION

(71) Applicant: Siemens Aktiengesellschaft, Munich (DE)

(72) Inventors: Andrés Botero Halblaub, Kirchseeon (DE); Jan Richter, Lauf a. d. Pengnitz (DE)

(73) Assignee: Siemens Aktiengesellschaft, Munich (DE)

( * ) Notice: Subject to any disclaimer, the term of this patent is extended or adjusted under 35 U.S.C. 154(b) by 1053 days.

(21) Appl. No.: 17/041,928

(22) PCT Filed: Feb. 28, 2019

(86) PCT No.: PCT/EP2019/054959
§ 371 (c)(1),
(2) Date: Sep. 25, 2020

(87) PCT Pub. No.: WO2019/185278
PCT Pub. Date: Oct. 3, 2019

(65) Prior Publication Data
US 2021/0141673 A1 May 13, 2021

(30) Foreign Application Priority Data
Mar. 27, 2018 (EP) .................... 18164275

(51) Int. Cl.
*G06F 9/50* (2006.01)
*G06F 9/52* (2006.01)
(Continued)

(52) U.S. Cl.
CPC .......... *G06F 9/5038* (2013.01); *G06F 9/5055* (2013.01); *G06F 9/52* (2013.01); *G06F 30/20* (2020.01); *G06F 2111/08* (2020.01)

(58) Field of Classification Search
None
See application file for complete search history.

(56) References Cited

U.S. PATENT DOCUMENTS

2007/0150322 A1* 6/2007 Falchuk ............ G06Q 10/0633
709/200
2007/0288443 A1* 12/2007 Sakurai ................. G06Q 10/00
(Continued)

FOREIGN PATENT DOCUMENTS

CN 105139080 A 12/2015
CN 105226643 A 1/2016
(Continued)

OTHER PUBLICATIONS

International Search Report and Written Opinion in corresponding PCT Patent Application No. PCT/EP2019/054959 dated Apr. 9, 2019. 13 pages.

(Continued)

*Primary Examiner* — Meng Ai T An
*Assistant Examiner* — Zujia Xu
(74) *Attorney, Agent, or Firm* — Schmeiser, Olsen & Watts LLP

(57) ABSTRACT

A method including a) receiving a computer generated data set of sequencing constraints describing a software system to be executed on an automation system and including software components and runnable function entities distributed over the number of computing nodes; b) generating a transition matrix from the data set of sequencing constraints, the transition matrix having a plurality of matrix elements each of them describing, by a transition value, a transition from a runnable function entity to another runnable function entity; c) receiving a computer generated communication matrix describing communication links between the computing nodes in the automation system; d) generating a Markov chain out of the data set of sequencing constraints (Continued)

and the communication matrix; e) generating a distribution function from the Markov chain describing used resources of the computing nodes by the software components and runnable function entities; and f) optimizing the allocation of resources.

15 Claims, 9 Drawing Sheets

(51) Int. Cl.
*G06F 30/20* (2020.01)
*G06F 111/08* (2020.01)

(56) References Cited

U.S. PATENT DOCUMENTS

| | | | |
|---|---|---|---|
| 2008/0100617 | A1 | 5/2008 | Keller et al. |
| 2010/0070958 | A1* | 3/2010 | Takagi ............. G06F 8/456 717/149 |
| 2013/0227585 | A1* | 8/2013 | Ichikawa ........... G06F 9/505 718/104 |
| 2014/0279675 | A1* | 9/2014 | Wiig ............... G06Q 10/067 705/348 |
| 2015/0025931 | A1* | 1/2015 | Li ................. G06Q 10/0633 705/7.27 |
| 2017/0103457 | A1* | 4/2017 | Acuña-Rohter ....... G06Q 40/04 |

FOREIGN PATENT DOCUMENTS

| | | |
|---|---|---|
| CN | 105657775 A | 6/2016 |
| CN | 106485093 A | 3/2017 |
| CN | 107743611 A | 2/2018 |
| EP | 3547125 A1 | 10/2019 |

OTHER PUBLICATIONS

Loeliger Hans-Andrea et al: "The Factor Graph Approach to Model-Based Signal Processing," Proceedings of the IEEE, IEEE. New York, US, vol. 95, No. 6, pp. 1295-1322, XP011189327, ISSN: 0018-9219, DOI: 10.1109/JPROC.2007.896497, the whole document; 2007; 28 pages.
Extended European Search Report in corresponding European Patent Application No. 18164275.2 dated Sep. 12, 2018. 7 pages.
Hökelek Ibrahim et al.; "On stability analysis of virtual backbone in mobile ad hoc networks"; Wireless Networks ; The Journal of Mobile Communication; Computation and Information, Kluwer Academic Publishers, DO; vol. 14; No. 1; Jun. 9, 2006 (Jun. 9, 2006); pp. 87-102; XP019582163; ISSN: 1572-8196.
Johansson B et al.; "On Distributed Optimization Using Peer-to-Peer Communications in Wireless Sensor Networks"; Sensor, Mesh and Ad Hoc Communications and Networks; 2008. SECON '08. 5th Annual IEEE Communications Society Conference on, IEEE, Piscataway, NJ, USA, Jun. 16, 2008 (Jun. 16, 2008); pp. 497-505; XP031282626; ISBN: 978-1-4244-1777-3.
Zhou Yuke et al.; "Parallel design and performance analysis of markov chain monte carlo algorithm"; Computer Applications and Software; vol. 34; No. 12; Dec. 15, 2017.

* cited by examiner

FIG 2

Runnables
   Runnable P211 ;
   Runnable P212 ;
   Runnable P213 ;
   Runnable COM_R ;
   Runnable R5 ;
   Runnable RTE2_R ;    SQ1
   Runnable R7 ;
   Runnable R8 ;
   Runnable R9 ;
Constraints
                                          RSC
   Runnable Sequencing Constraints
     Runnable Sequencing Constraint rsc1
       Order Type Successor
       R8 --> R9
       User-defined: true
     ;

Runnable Sequencing Constraint COM_R --> RTE2_R    → (3a)
       Order Type Successor
       COM_R --> RTE2_R
       User-defined: false
     ;

Runnable Sequencing Constraint RTE2_R --> P212    → (3b)
       Order Type Successor
       RTE2_R --> P212
       User-defined: false
     ;

Runnable Sequencing Constraint P212 --> P211
       Order Type Successor
       P212 --> P211
       User-defined: false
     ;

Runnable Sequencing Constraint P211 --> P213
       Order Type Successor
       P211 --> P213
       User-defined: false
     ;

FIG 5

Constraints ← SQ1

> Runnable Sequencing Constraints
>    Runnable Sequencing Constraint COM_R --> RTE1_R
>      Order Type Successor
>      COM_R --> RTE1_R
>      User-defined: false   → 6a ;
Runnable Sequencing Constraint RTE1_R --> P11
   Order Type Successor
   RTE1_R --> P11
   User-defined: false ;
Runnable Sequencing Constraint RTE1_R --> P12
   Order Type Successor
   RTE1_R --> P12
   User-defined: false ;
Runnable Sequencing Constraint RTE1_R --> P13
   Order Type Successor
   RTE1_R --> P13
   User-defined: false > ;
> Runnable Sequencing Constraint P11 --> RTE1_W
>    Order Type Successor
>    P11 --> RTE1_W
>    User-defined: false
>
> ;
> Runnable Sequencing Constraint P12 --> RTE1_W
>    Order Type Successor
>    P12 --> RTE1_W
>    User-defined: false       → 6b
>
> ;
> Runnable Sequencing Constraint P13 --> RTE1_W
>    Order Type Successor
>    P13 --> RTE1_W
>    User-defined: false ;
Runnable Sequencing Constraint RTE1_W --> COM_W
   Order Type Successor
   RTE1_W --> COM_W
   User-defined: false

FIG 11

| msg | Sig | ECU 1 | ECU 2 |
|---|---|---|---|
| m1 | $\overrightarrow{\mu COM_r \to RTE_{2r}}$ | R | |
| m2 | $\overrightarrow{\mu COM_r \to RTE_{1r}}$ | | R |
| m3 | $\overrightarrow{\mu RTE_{1w} \to COM_w}$ | W | |
| m4 | $\overrightarrow{\mu RTE_{2w} \to COM_w}$ | | W |

OPTIMIZED ALLOCATION OF RESOURCES TO NODES OF AN AUTOMATION SYSTEM BASED ON MONTE CARLO SIMULATION

CROSS-REFERENCE TO RELATED APPLICATIONS

This application claims priority to PCT Application No. PCT/EP2019/054959, having a filing date of Feb. 28, 2019, which is based off of European Patent Application No. 18164275.2, having a filing date of Mar. 27, 2018, the entire contents both of which are hereby incorporated by reference.

FIELD OF TECHNOLOGY

The following relates to a method and a system for configuration of an automation system having a number of computing nodes.

BACKGROUND

The design of embedded software systems for use in an automation system consists of several interconnected steps involving experts from different domains. It starts with the conceptual design of algorithms for signal processing, estimation, and control. In the conceptual phase, the principles of information are derived, such as a list of needed signals, the type in structure of processing algorithm, and its parameterization for adequate operation with the physical system at hand. This stage is often conducted in a model-based design tool, such as The Mathworks' Matlab/Simulink or Ansys Esterel's Scade Suite.

After the concept design, the algorithms are handed to software engineers who split them up into software components and runnable functions (so called: runnables), distribute them over embedded computing nodes (electronic control units, ECUs), marry the runnables, i.e. runnable function entities, to the tasks of an operation system, design schedules, and design communications between the computing nodes.

In the state of the art, the schedule design within a computing node is supported by schedule optimization tools, such as Timing Architects' TA Suite. Similar tools, such as Mentor Graphics VSA COM Designer, optimize the communication design for bus systems.

The interaction between discipline specialists in the concept phase and software engineering phase is problematic. These groups use different languages, different models, and different tools. Proper communication between algorithm designers (signal processing and control engineers) and software engineers is, however, vital for ensuring that the algorithms' runnables are executed in an appropriate order and with appropriate timing, when deployed. A neglect in that area leads to improper deployment defects that need to be detected and debugged during verification actions.

In the conceptual phase of the design of embedded software many concurrent software components have to be scheduled to run in part in parallel and in part sequentially to meet time constraints. Finding out from the architectural structure how each one of the software elements can impact each other and the complete project, can diminish costs and problems at a later stage.

Software architectures can be defined in a plurality of languages, e.g. UML, SysML, EAST-ADL, AADL, etc. With respect to timing, ARINC, Amalthea and EAST-ADL define timing constraints for an embedded preemptive target environment. However, it is vital for a proper design of the embedded software to conduct timing analysis of software execution in a preemptive operating system from a software architectural perspective.

SUMMARY

An aspect relates to a method and a system for configuration of an embedded software to be used for configuration of an automation system which enables an automated and easy conducting of timing analysis of software execution.

An aspect relates to a computer program product (non-transitory computer readable storage medium having instructions, which when executed by a processor, perform actions) and a system.

According to a first aspect of the present invention, a method for computer-implemented configuration of an automation system having a number of computing nodes by means of a processing unit is provided. The method comprises a step a) of receiving, at the processing unit, a computer generated data set of sequencing constraints describing a software system to be executed on the automation system and consisting of software components and runnable function entities distributed over the number of computing nodes as well as timing, sequencing and concurrency information of the runnable function entities. The method comprises a step b) of generating, by the processing unit, a transition matrix from the data set of sequencing constraints, the transition matrix having a plurality of matrix elements each of them describing, by a transition value, a transition from a runnable function entity to another runnable function entity. The method comprises a step c) of receiving, at the processing unit, a computer generated communication matrix describing communication links between the computing nodes in the automation system. In addition, the method comprises a step d) of generating, by the processing unit, a Markov chain out of the data set of sequencing constraints and the communication matrix. The method comprises a step e) of generating, by the processing unit, a distribution function of the Markov chain describing, for a specific timing distribution of the software components and the runnable function entities, used resources of the computing nodes by the software components and runnable function entities. Finally, the method comprises a step f) of optimizing, by the processing unit, the allocation of resources by formulation and solving constrained optimization problems.

According to a second aspect, a system for configuration of an automation system having a number of computing nodes is suggested, the system comprising a processing unit configured to a) receive a computer generated data set of sequencing constraints describing a software system to be executed on the automation system and consisting of software components and runnable function entities distributed over the number of computing nodes as well as timing, sequencing and concurrency information of the runnable function entities; b) generate a transition matrix from the data set of sequencing constraints, the transition matrix having a plurality of matrix elements each of them describing, by a transition value, a transition from a runnable function entity to another runnable function entity; c) receive a computer generated communication matrix describing communication links between the computing nodes in the automation system; d) generate a Markov chain out of the data set of sequencing constraints and the communication matrix; e) generate a distribution function from the Markov chain describing, for a specific timing distribution of the software components and the runnable function entities, used resources of the computing nodes by the software components and runnable function entities; f) optimize the allocation of resources by formulation and solving constrained optimization problems.

This approach allows conducting timing analysis of a software in a preemptive operating system from a software architectural perspective. Markov chains are used to model software runnables based on an architectural approach and as a way of sampling execution traces in an automation system having several computing nodes. With this approach, it is possible to determine the behavior from specific runnables to the overall ensemble behavior of the software project. The method can be extended to take into consideration further modules such as hardware, communication bus, and automation system behavior to sample the trace and test the architecture design at an early stage of embedded software design.

With the method suggested, an approximation of the execution times of software components as a probability distribution is possible. Estimating time repercussions of the software components of the software project can be considered. In particular, communication bottlenecks with respect to timing aspects can be identified. Concurrent tasks, runnables, communication, computing node topology and software component architecture can be considered by bearing in mind ordering and timing requirements to create the stochastic model of the software.

The method can be conducted in the sequence from step a) to f) as outlined above. Alternatively, steps a) and c) may be processed in parallel, followed by step b) succeeding step a).

The data set of sequencing constraints is generated from a factor graph representing the automation system as a unified graphical notation. Factor graphs support the design of algorithm concepts, and capture the essential constraints for scheduling the parts of an algorithm on multiple computing nodes. A factor graph representing the automation system may be annotated with further details to ensure consistency in the design and software engineering domains. A factor graph representing the automation system and used to generate the sequencing constraints can be provided as a result of manual work. A possible way to provide the factor graph in a computer-implemented manner is described in the parallel patent application EP18164183.8.

The computer generated data set of sequencing constraints consists of a description of an edge for each pair of runnable function entities.

In addition, the computer generated data set of sequencing constraints may consist, for each pair of runnable function entities, the direction of communication, the identifiers of the runnable function entity from which the communication originates and the runnable function entity which is the recipient of the communication, an identifier of the signal of communication, and a compute node or nodes which are involved in the communication. Optionally, further information may be provided and used to define and describe the sequencing constraints describing the software system.

The communication matrix describes the message exchange between the computing nodes along with the signals contained in messages, and their timing requirements. Using such a communication matrix allows identifying those computing nodes which are part of the software system when run on the automation system and its computing nodes.

From the communication matrix, each of the runnable function entity can be assigned to a specific computing node (which is represented by a modeled scheduler) of the automation system. Thereby, a transition graph may be generated illustrating relationships between the different entities and their assignment to different computing nodes (and scheduler, respectively).

The transition matrix may be generated from the data set of sequencing constraints, where the communication matrix may add information which of the matrix elements belong to which of the computing nodes.

According to a further exemplary embodiment, each runnable function entity has a timing distribution associated with it indicating its execution time wherein the distribution function obtained in step e) is generated in an iterative manner by varying the execution time by means of a Monte Carlo simulation to predict the timing properties of the software system. Other probability distribution annotation can describe more complex behaviors that can affect scheduling and preemptive response of the system. Other probability distribution annotations may come from traces of real execution of the runnables or on the actual target, prior knowledge or guesses. By assigning a timing distribution with each runnable function entity the approximation of the execution times of the software components as a probability distribution can be provided. Furthermore, it is possible to find an optimum by varying the execution time by means of Monte Carlo simulation.

According to a further exemplary embodiment, the matrix elements of the transition matrix comprise an execution timing information representing the timing behavior of each runnable function entity. From that, a timing sequence diagram for each computing node may be gained from the transition matrix.

According to a third aspect, a computer program product directly loadable into the internal memory of a digital computing unit is provided, comprising software code portions for performing the steps of the method set out herein and thereafter when the product is run on the computing unit. The computer program product may be in the form of a storage medium, such as a DVD, a CD-ROM, an USB memory stick and so on. Furthermore, the computer program product may be in the form of a signal which is loadable via a wireless or wired communication link.

BRIEF DESCRIPTION

Some of the embodiments will be described in detail, with reference to the following figures, wherein like designations denote like members, wherein:

FIG. 2 depicts a part of a data set of sequencing constraints describing a first part of the software system of FIG. 1;

FIG. 5 depicts a part of a data set of sequencing constraints describing a second part of the software system of FIG. 1;

FIG. 11 depicts a communication matrix.

DETAILED DESCRIPTION

Software architecture for technical systems, such as embedded devices of an automation system, at the beginning of its design is understood as a process of defining software components with ports, interfaces, connections and their interaction. At this early stage, some preliminary design estimations are made with respect to concurrency, sequence and timing of software components based on available knowledge of an algorithm of the software architecture and functions behind it.

Describing execution timing from the software project architecture view helps to predict possible program execution bottlenecks in the later phases of the design of the software. To be able to identify execution bottlenecks and to approximate execution times of software components, the method according to the embodiment of the present invention uses a well-known factor graph which describes the algorithm of the software architecture.

A factor graph is a unified graphical notation for a wide variety of signal processing, estimation, stochastic reasoning, machine learning, and control algorithms. Factor graphs support the design of algorithm concepts, and capture essential constraints for scheduling parts of an algorithm on multiple computing nodes. A factor graph is therefore a graphical representation of a factorized function, as described in detail in [1].

Figure 1:
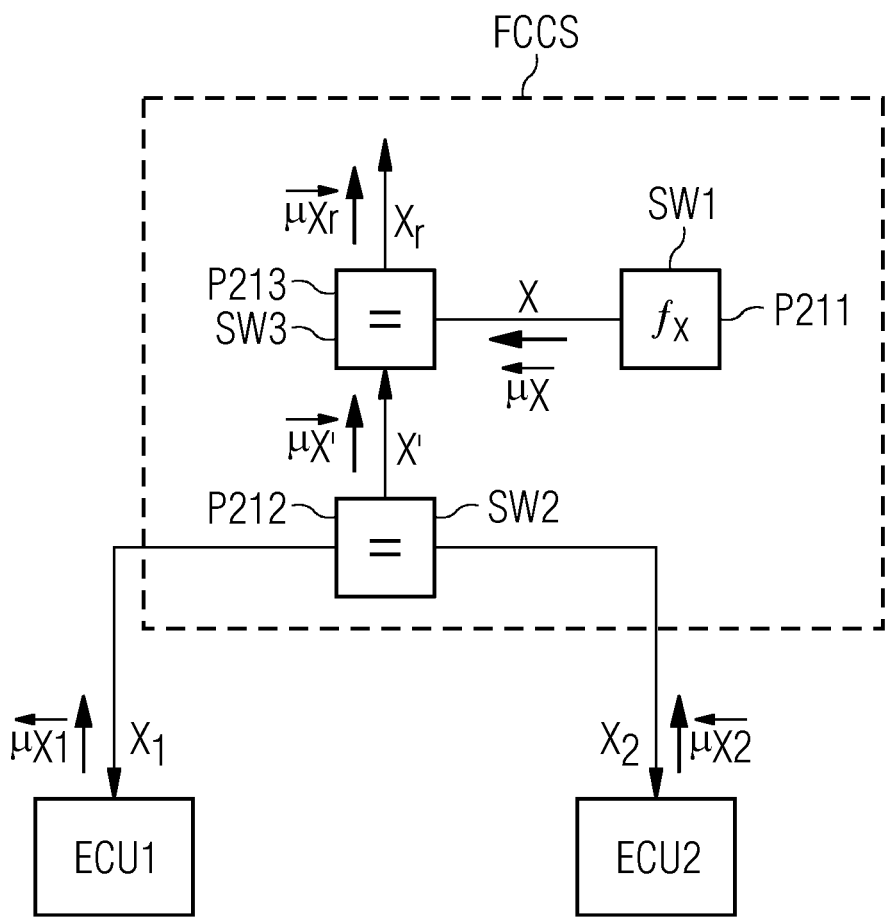
FIG. 1 depicts a schematic diagram depicting a software system and computing nodes described as a factor graph.

FIG. 1 illustrates an exemplary factor graph of a simple software system that calculates a value from two independent measurements provided by different computing nodes ECU1, ECU2 by means of a known sensor fusion. The factor graph outlined in FIG. 1 describes the sensor fusion algorithm. The software system consists of three different software components SW1, SW2 and SW3 running on a computing node FCCS. Software component SW2 receives sensor values from the aforementioned two computing nodes ECU1, ECU2 representing embedded control units.

In this factor graph, edges between two software components SW1, SW2, SW3 and a software component SW1, SW2, SW3 and an embedded computing unit ECU1, ECU2, respectively, describe a result whose value is denoted by capital letters. A message from one software component to another software component SW1, SW2, SW3, and an embedded control unit ECU1, ECU2, respectively, is denoted with a message p while the direction of the message is indicated by the bold arrow located adjacent the respective edge.

The three exemplary software components SW1, SW2, SW3 are associated with a respective runnable P211, P212, P213, i.e. a runnable function entity. The embedded control units ECU1, ECU2 are associated with a respective scheduler. These runnables together with allocated resources and read or written messages as well as their execution by a respective scheduler will be used to determine the approximation of execution times of the software system. The procedure will be described below.

For the understanding of the present invention, the detailed interaction between the software components and the embedded control units is not relevant. With regard to the present invention, the factor graph of the software system to be assessed is regarded as given. The factor graph as outlined in FIG. 1 can be provided automatically, as described in the patent application EP18164183.8 of the applicant. Alternatively, such a factor graph can be provided as a result of manual work of a software engineer.

From the description of the factor graph, one or more runnable sequencing constraints can be derived. Furthermore, a communication matrix describing communication links between the computing nodes can be generated. The process of automatically generating the runnable sequencing constraints and the communication matrix is not part of the present invention. Their computer-implemented generation, using the factor graph as input, is described in the parallel patent application EP18164183.8 of the applicant.

The runnable sequencing constraints and the communication matrix will be used as inputs to automatically determine the execution time behavior of the software system. An example of a respective data set of sequencing constraints which is received by a processing unit performing the present invention is given in FIG. 2 and FIG. 5.

The runnable sequencing constraints is, for example, an XML file describing e.g. an Amalthea model consisting, for each pair of interacting runnable function entities, the direction of communication, identifiers of the runnable function entity from which the communication originates and the runnable function entity which is the recipient of the communication, an identifier of the signal of communication and the compute node or nodes which are involved in the communication.

In the data set of sequencing constraints SQ1 according to FIG. 2, by way of example only, four "communications" between respective pairs of interacting runnable function entities are outlined, starting with the phrase "Runnable Sequencing Constraints" RSC. This initiating phrase RSC is followed by the runnable from which the communication originates, an arrow and the runnable which is the recipient of the communication. The runnable sequencing constraints for each "communication" consists an information about the order type (here: successor), the pair of runnables from which the communication originates and to which the communication is going (here: "COM_R→RTE2_R" representing a first communication 3a, "RTE2_R→P212" representing a second communication 3b, and so on) and an information whether the runnable sequencing constraint is user-defined or not (here: false). The information about the direction of communication is indicated by the arrow connecting the two runnables. The information about the identifier of the signal of communication (as outlined in FIG. 1) and the compute node or nodes which is or are involved in a communication is missing in the present example although they could be part of the data set of sequencing constraints SQ1.

It is assumed that the runnables of SQ1 are executed by a scheduler corresponding to the computing node ECU2.

It is to be noted that the data set of sequencing constraints SQ1 is generated out of the factor graph where this generation can be made computer generated. The data set of sequencing constraints is used as a first input to the method according to the present invention.

From the data set of sequencing constraints SQ1 a transition matrix P may be built. The transition matrix P is in the form $$P = \begin{pmatrix} P_{1,1} & P_{1,2} & \cdots & P_{1,j} & \cdots & P_{1,S} \\ P_{2,1} & P_{2,2} & \cdots & P_{2,j} & \cdots & P_{2,S} \\ \vdots & \vdots & \ddots & \vdots & \ddots & \vdots \\ P_{i,1} & P_{i,2} & \cdots & P_{i,j} & \cdots & P_{i,S} \\ \vdots & \vdots & \ddots & \vdots & \ddots & \vdots \\ P_{S,1} & P_{S,2} & \cdots & P_{S,j} & \cdots & P_{S,S} \end{pmatrix}.$$

Figure 3:
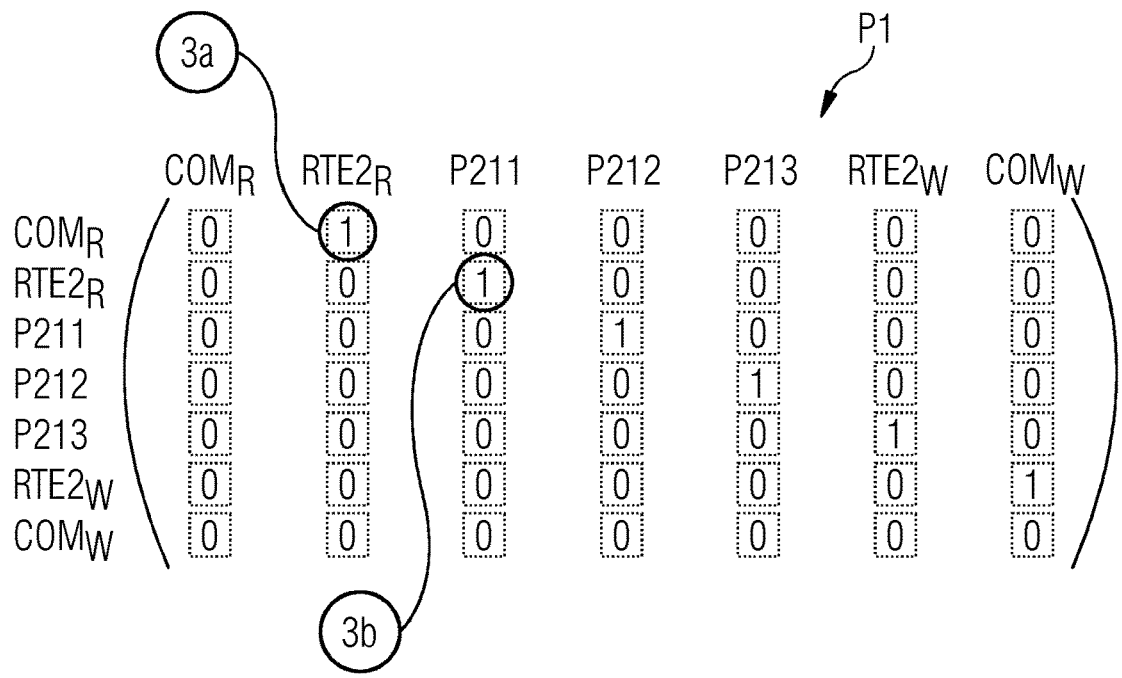
FIG. 3 depicts a transition matrix generated from the data set of sequencing constraints according to FIG. 2.

The transition matrix P has a plurality of matrix elements $P_{i,j}$ each of them describing, by a transition value, a transition from a runnable to another runnable. This is illustrated in FIG. 3 wherein the communications 3a and 3b of FIG. 2 are emphasized by a circle. FIG. 3 illustrates a transition matrix P1 created from the data set of sequencing constraints SQ1 of FIG. 2. The transition matrix P consists of a number of columns i which corresponds to the number of runnables defined and identified in the data set of sequencing constraints. The number of rows j of the transition matrix corresponds to the number of columns, i.e. i=j. The number of rows and their sequence follows the sequence of runnable sequencing constraints in the data set of sequencing constraints. In other words, the columns specify the receiving runnables and the rows specify the originating runnables.

In the present example of FIG. 3, seven runnables $COM_R$, $RTE2_R$, P211, P212, P213, $RTE2_W$, $COM_W$ are identified. It is to be noted that an index "R" (corresponding to "_R") in the name of a runnable relates to a reading operation and an index "W" (corresponding to "_W") relates to a writing operation of the runnable.

If there is a communication between the originating runnable and the receiving runnable a transition value $P_{i,j}$ will be put into the transition matrix. The transition value represents an execution priority and/or an information about the amount of resources which can be allocated to a specific runnable by a computing node executing the runnable. If the transition value is "1" all resources can be allocated to the executing runnable. If resources have to be shared the transition value is less than "1". The sum of the transition values of one row should equal to "1" in case of shared resources. If there is no communication between an originating runnable and a different runnable, the transition value in the transition matrix $P_{i,j}$ is set to "0".

According to the chosen example of SQ1, the communication sequence is sequential resulting from the fact that there is no parallel execution of tasks. As a result, the transition values if to be set is set to "1". This is exemplified for the runnable sequencing constraint COM_R→RTE2_R where a transition value $P_{i,j}=1$ is put into the transition matrix P (3a). The transition value "1" is put in the first row of the transition matrix and the column $RTE2_R$ which is the receiving runnable. The next communication originates from runnable $RTE2_R$ and is received by runnable P211. Therefore, in column P211 of the succeeding row a transition value $P_{i,j}=1$ is put into the transition matrix (3b), and so on.

Figure 4:
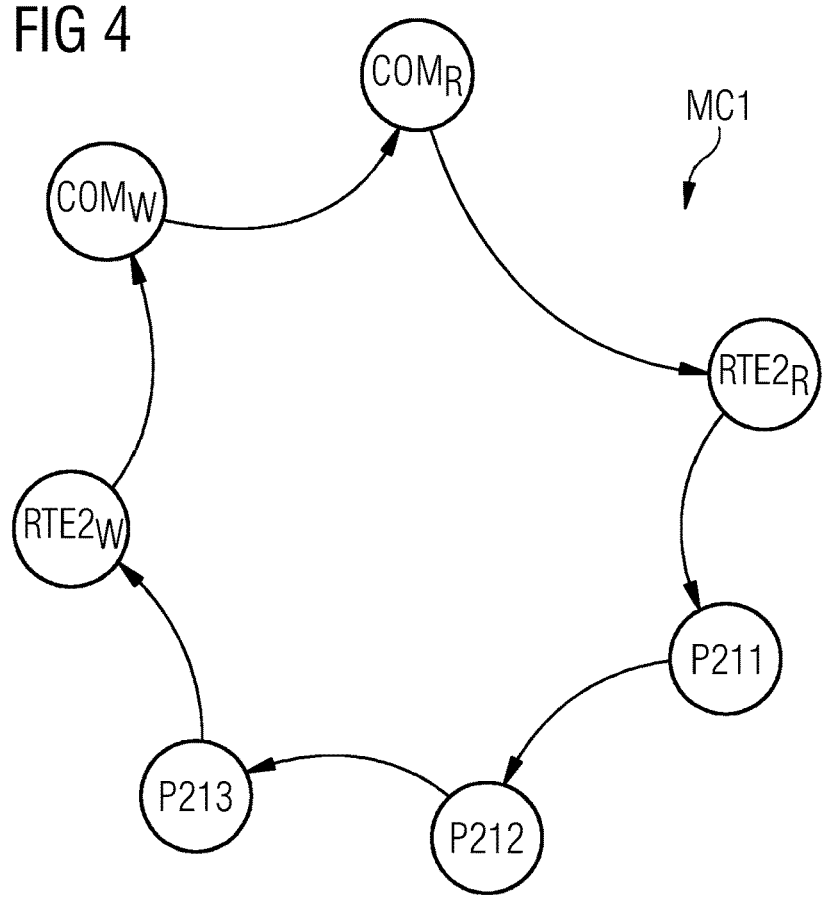
FIG. 4 depicts a Markov chain generated from the transition matrix of FIG. 3.

From the transition matrix P1 in FIG. 3, a Markov chain MC1 as illustrated in FIG. 4 can be determined. The Markov chain consists of a number of nodes corresponding to the runnables in the data set of sequencing constraints SQ1. According to the chosen example, it can be seen that the Markov chain in FIG. 4 consists of the seven runnables $COM_R$, $RTE2_R$, P211, P212, P213, $RTE2_W$ and $COM_W$. As can be seen from the Markov chain, the sequence of tasks is in a step-by-step order, i.e. sequential.

Another software part of the software system defined by the factor graph of FIG. 1 is described by the data set of sequencing constraints SQ2 according to FIG. 5. It is to be noted that the method can be carried out with a plurality of different data sets of sequencing constraints each of them describing a part of the software system to be assessed. However, the information about the sequencing constraints can be part of a single data set of sequencing constraints as well.

In the data set of sequencing constraints SQ2 according to FIG. 5, by way of example only, seven runnables $COM_R$, $RTE1_R$, P11, P12, P13, $RTE1_W$ and $COM_W$ are noted. As will be recognized, some of the runnables (namely, $COM_W$ and $COM_R$) in the data set of sequencing constraints SQ2 correspond to the runnables of the data set of sequencing constraints according to FIG. 2 and some of them are different (namely, all the others). The structure of the data set of sequencing constraints SQ2 corresponds to the data set of sequencing constraints SQ1 as described above.

Figure 6:
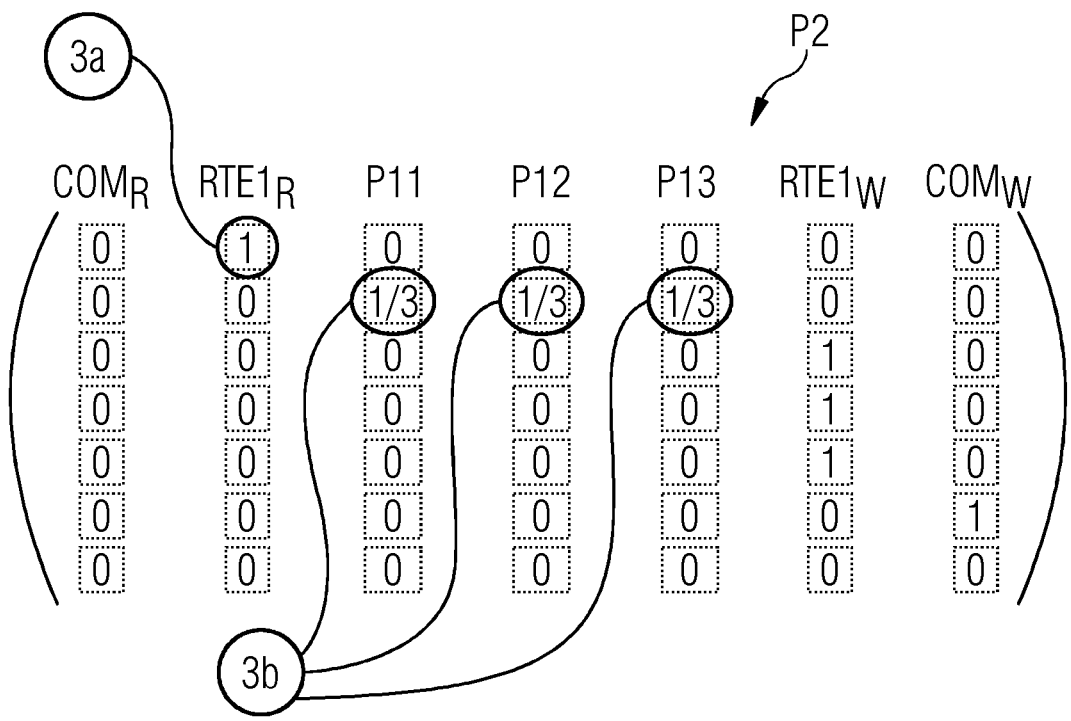
FIG. 6 depicts a transition matrix generated from the data set of sequencing constraints according to FIG. 5.

FIG. 6 illustrates a transition matrix P2 resulting from the data set of sequencing constraints of FIG. 5. The structure of the transition matrix P2 corresponds to the transition matrix P2 as described above. As can be seen from FIG. 5 (rectangular denoted with 6b) there are three parallel processes originating from different runnables P11, P12 and P13 but being received from the same runnable RTE1_W (corresponding to the notation $RTE1_W$). In other words, there are three processes which have to be executed in parallel. Under the assumption that they are carried out by the same scheduler (assumed: computing node ECU1) the resources have to be allocated to the three runnables P11, P12, P13 at the same time. As a result, each transition value is set equally to ⅓. Although the starting value of the transition value could be set arbitrarily, allocating the resourcing of the computing node in an equal manner is a good starting point. Later on, an adaption of the transition values may be made according to satisfiability of the timing constraints.

Figure 7:
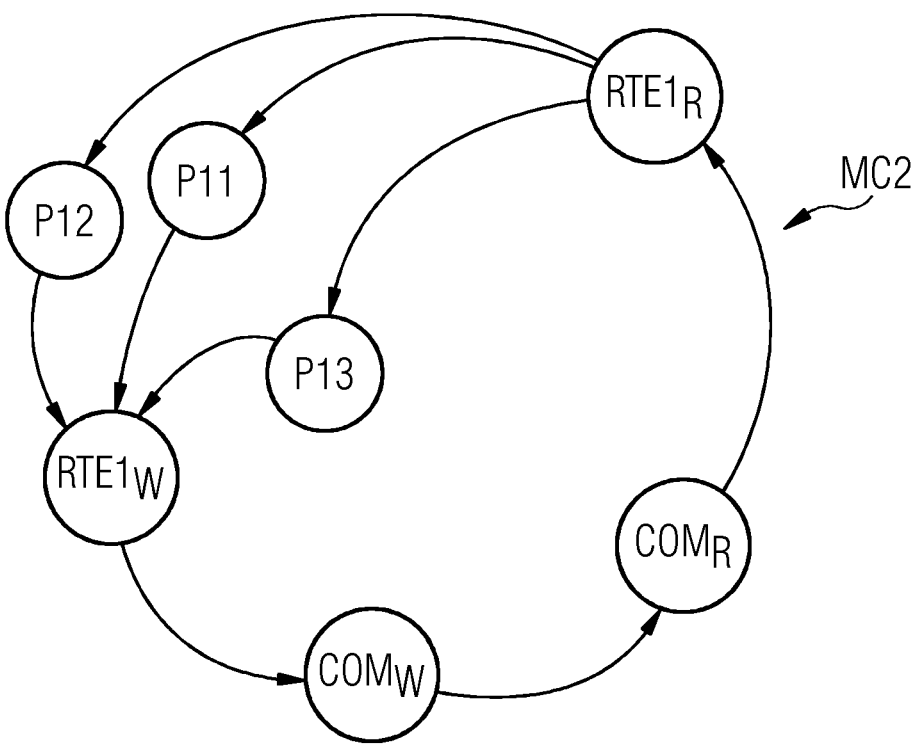
FIG. 7 depicts a Markov chain generated from the transition matrix of FIG. 6.

FIG. 7 illustrates the Markov chain MC2 resulting from the transition matrix according to FIG. 6. As can be easily seen, the runnable RTER transmits messages to runnables P11, P12, P13 in parallel where they are executed in parallel. The results of runnables P11, P12, P13 are forwarded to runnable $RTE_W$. The other communication is carried out step by step.

Figure 8:
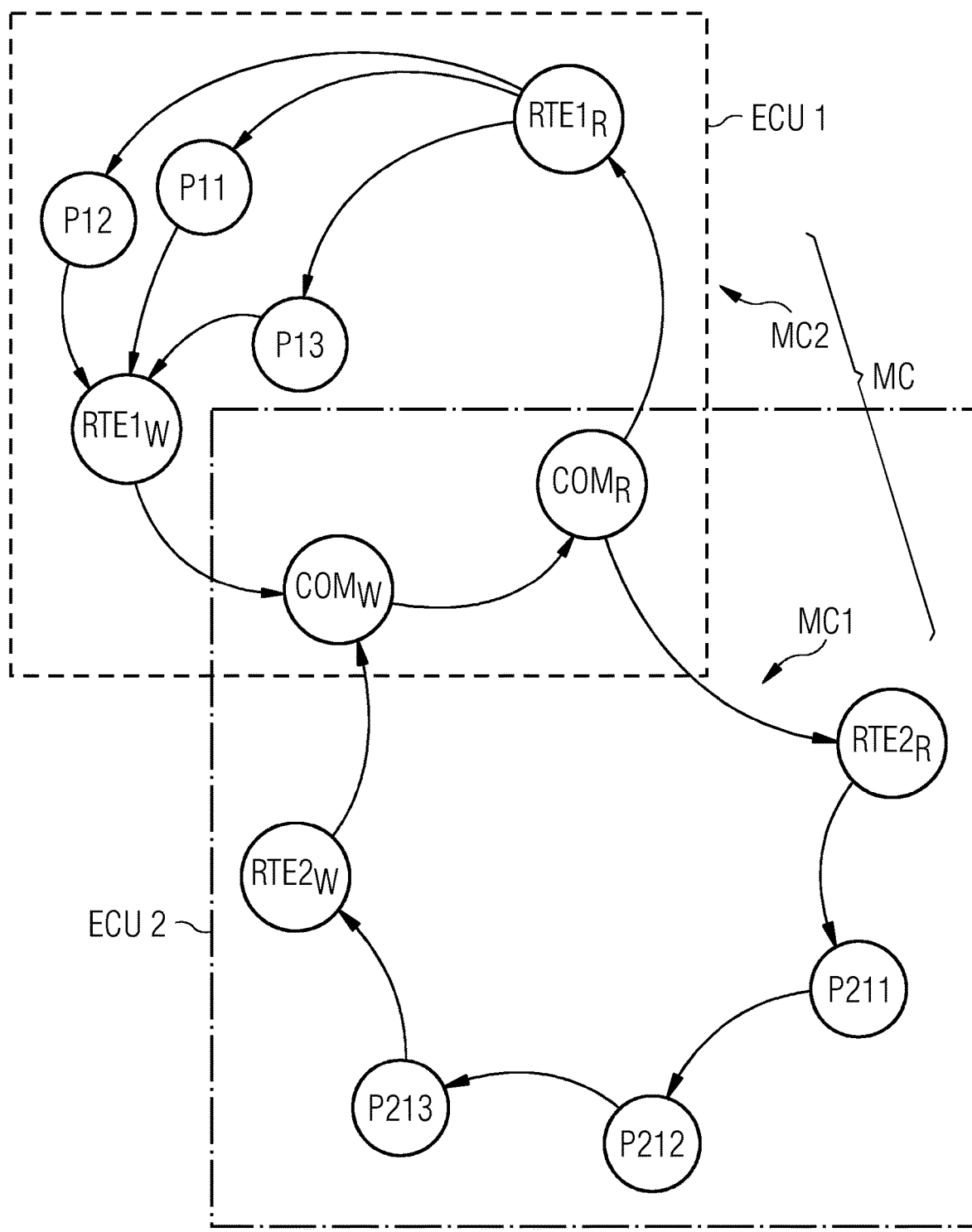
FIG. 8 depicts a Markov chain of runnables of the software system according to FIG. 1.

The Markov chains MC1, MC2 as illustrated in FIGS. 4 and 7 constitute, as already explained, parts of the software system. In FIG. 8, these two parts are put together in a joint Markov chain MC which can be made by unifying the transition matrices according to FIG. 3 and FIG. 6. The joint Markov chain MC can be derived from a joint transition matrix (not shown) resulting from combining the transition matrices P1 and P2. As is apparent from FIG. 8, the runnables $COM_W$ and $COM_R$ are needed by both parts of the software system. They can be, for example, executed by the computing node FCCS in FIG. 1.

Figure 9:
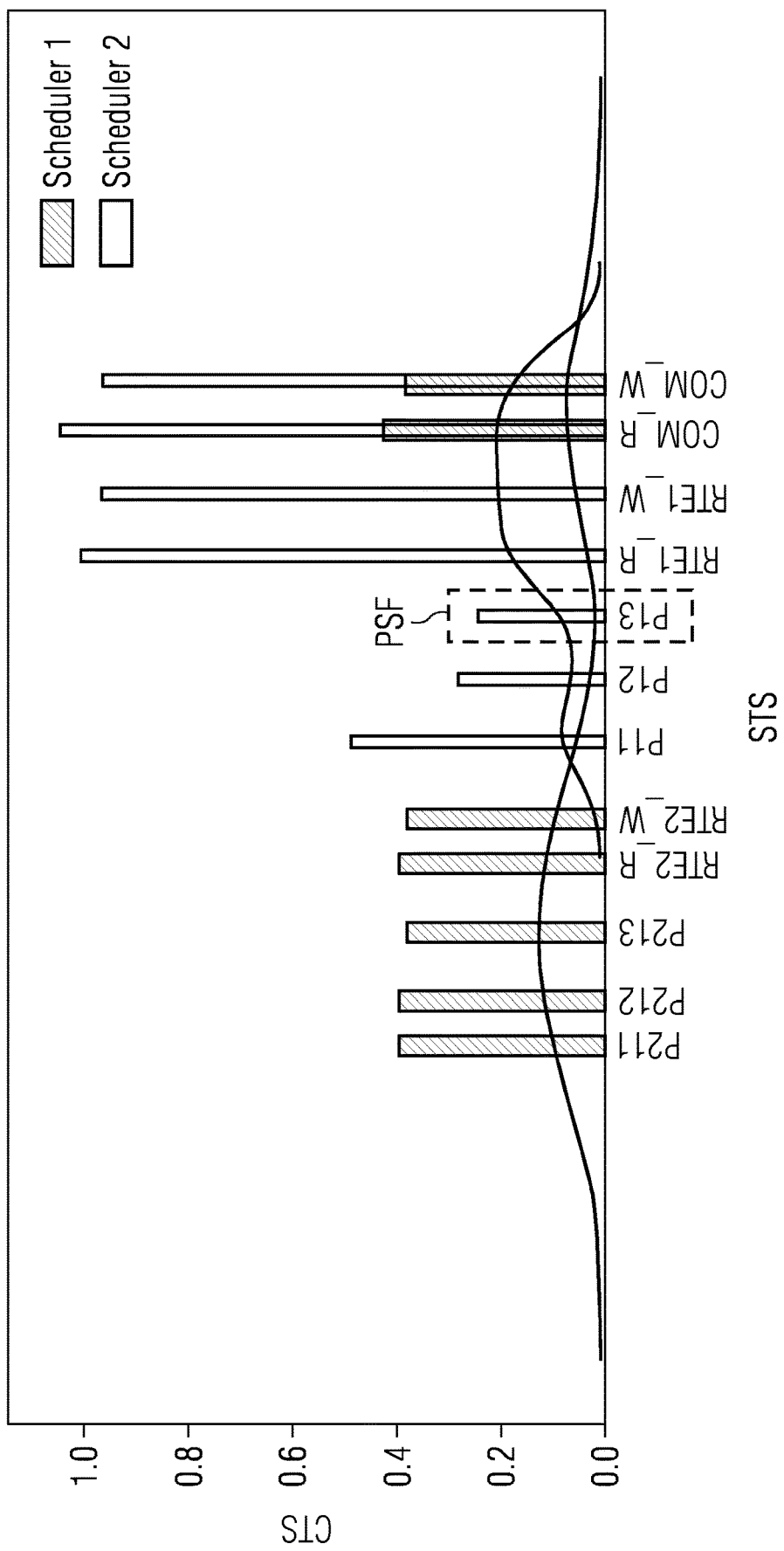
FIG. 9 depicts a resulting distribution function after a Monte Carlo simulation.

A resulting distribution of needed resources after a Monte Carlo simulation due to different allocated resources and/or execution time of the runnables is illustrated in the count-state-diagram according to FIG. 9. In FIG. 9, the states STS of each runnable P211, P212, P213, RTE2_R, RTE2_W, P11, P12, P13, RTE1_R, RTE1_W, COM_R and COM_W and the needed resources CTS according to the amount of execution are illustrated. The runnables are associated to a scheduler 1 or 2 depending on which of them is executing them. It can be seen that Scheduler 1 passes through runnables COM_R and COM_W less frequent than scheduler 2. This can be an important information for possible resource allocation. An information with regard to resource allocation can be taken from the fact that, for example, scheduler 1 passes less often through runnable P13 than through the other runnables (see labelling PSF in FIG. 9). This can indicate internal resource problems in the computing node.

The association of the runnables to a scheduler may be made from a communication matrix as shown in FIG. 11. The communication matrix comprises information about a message msg, a signal Sig, and involved embedded control units ECU1, ECU2 wherein an involvement consists of a reading (R) or writing (W) operation. Generation of the communication matrix is described in the parallel patent application EP18164183.8. The communication matrix allows to generate the amount of necessary schedulers and associated interfaces. As a result, sub-matrices of the transition matrix are determined where each sub-matrix is associated to a scheduler. It is to be noted that the sub-matrices may be determined such that they overlap in case runnables (in the example: $COM_W$ and $COM_R$) are needed by different parts of the software system.

Figure 10:
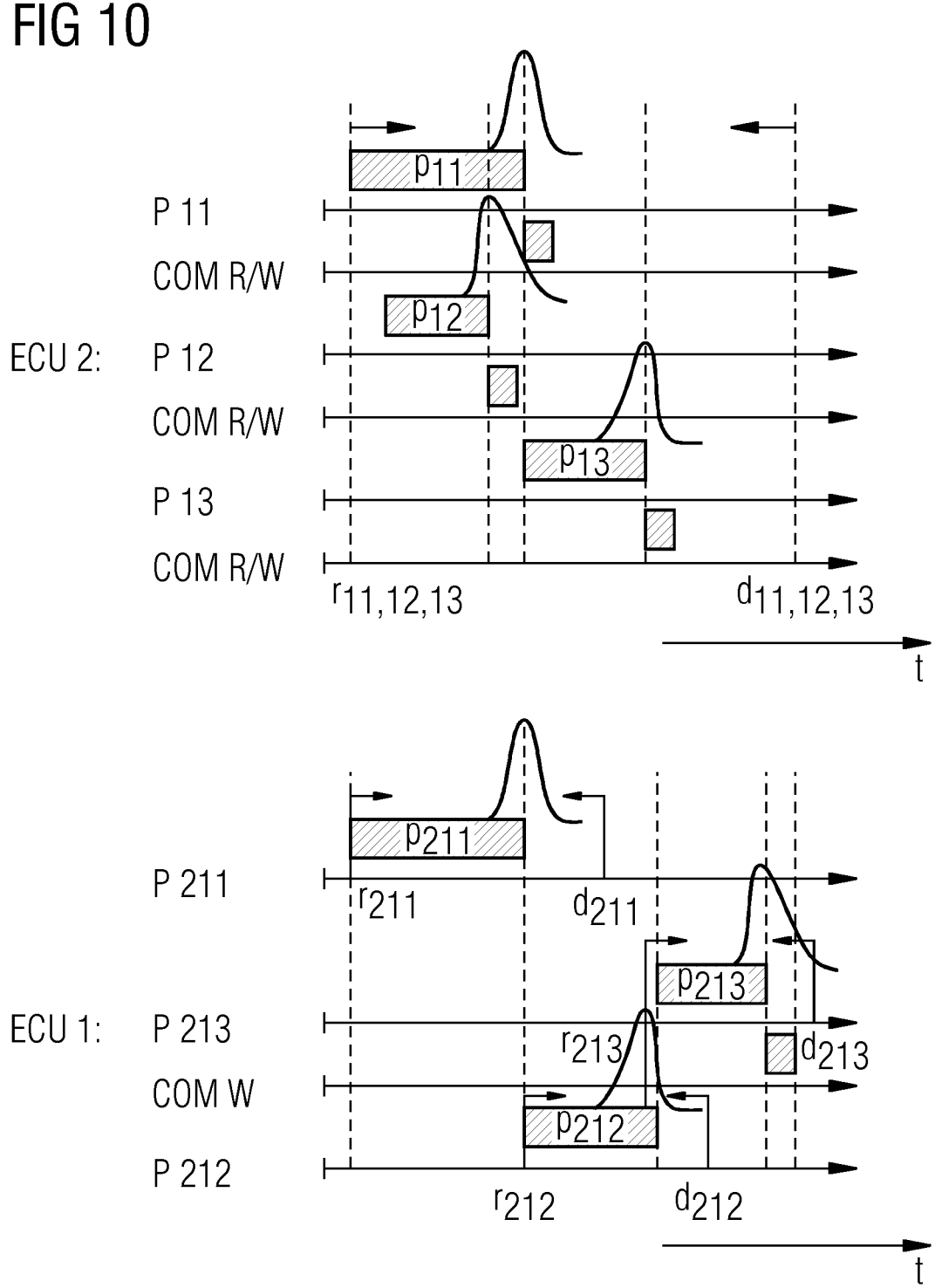
FIG. 10 depicts an execution scheduling generated to feed an optimizer with a resulting setup wherein the timing of some runnables of one computing node and the timing of some runnables of another computing node are outlined for further analysis and optimization.

The estimation of the execution timing transition matrices show a timing behavior of the software component such that a sequence diagram as shown in FIG. 10 can be gained and used for further analyses. Using the sequencing constraints from the latter processes, a sequence diagram can be gained. Furthermore, annotating additional information such as data aging constraints, the timing constraints can be more accurately defined and minimum/maximum timing restrains derived. The allocation of runnables to given embedded computing nodes and ultimately the communication matrix FIG. 11 renders the allocation of specific schedulers.

In FIG. 10, timing diagrams for execution of some of the runnables are shown. By way of example only, the aforementioned embedded control units ECU1, ECU2 are configured in different ways. ECU2 whose timing diagram is shown in the upper part of FIG. 10 has a couple of software components, but no specification concerning timing and sequencing aspects are made. ECU1 on the other hand is parameterized such that the software components must follow a certain sequence pattern and must finish calculation within specified time lapses. The timing sequence of ECU1 is shown in the lower part of FIG. 10. This parameterization can be put to the respective transition values of the transition matrices P1, P2.

In FIG. 10, $p_j$ describes an estimated process time (execution time) for task j. $r_j$ denotes the release time (start time) for a task j which becomes available for processing. The due date (required end time) for a task j is denoted with $d_j$.

For the runnables P11, P12 and P13 which are executed by ECU2 the release times $r_{11}$, $r_{12}$, $r_{13}$ start at the same time. The estimated process time for the task P11, P12 and P13 is different (represented by the width of p11, p12, p13). As can be seen from FIG. 10, the actual release time for the three processes P11, P12, P13 is at different times. The due dates $d_{11}$, $d_{12}$, $d_{13}$ for these three processes P11, P12, P13 executed by ECU2 is, by way of example, at the same time. Since each of the processes P11, P12, P13 has finished before the respective due date $d_{11}$, $d_{12}$, $d_{13}$, all time constraints are fulfilled. The time periods denoted with COM R/W following the finished processes P11, P12, P13 represent a time which is needed for communication purposes, such as a reading or writing an information to a communication line.

The processes P211, P213 and P212 executed by ECU1 are parameterized such that the software components have to follow a certain sequence pattern. In particular, process P211 starts at release time r211 as the first process. As soon as process P211 has finished, process P212 starts. Furthermore, process P213 starts as soon as process P212 has finished. A communication process COM_W follows after process P213 has ended. Each of the processes has a different release time r211, r212 and r213 as well as different due dates $d_{211}$, $d_{212}$ and $d_{213}$.

Each runnable P11, P12, P13 and P211, P212, P213 has a timing distribution associated with. The timing distribution indicates its execution time wherein the distribution function as shown in FIG. 9 is generated in an iterative manner by varying the execution time by means of a Monte Carlo simulation to predict timing properties of the software system. The timing function may be a gamma distribution as associated to the processes P11, P12, P13 and P211, P212, P213 of FIG. 10. Alternatively, the timing distribution may be a beta distribution or a uniform distribution.

By varying the timing distribution it is checked whether the timing constraints are or can be fulfilled. In particular with regard to ECU2 it is checked whether the due date $d_{11}$, $d_{12}$, $d_{13}$ can be met by each of the processes P11, P12, P13 even if the estimated process time for these tasks P11, P12, P13 is varied according to the timing distribution as illustrated. The same is done for the processes P211, P212 and P213 executed by ECU1.

The layout of the execution scheduling as shown in FIG. 10 can be described as an optimization problem or as a SAT (satisfiability problem). Such a representation can pinpoint possible unsatisfying timing requirements. In case of an infeasible solution, the root cause will be spotted by so-called helper variables.

In this context the SAT description of the problem proves whether the given timing limitations can be held for a set of samples from a Monte Carlo simulation of the software setup, i.e. if the solution of the problem lies within the feasible set of constraints, the timing aspects at the current stage can be held. Concretely the execution sample of, for instance, P212 must result within the constraints r212<=p212<=d212 to satisfy the setup needs.

Such timing constrains are generated automatically as seen in FIG. 10 and can be solved pinpointing bottlenecks within the setup. The generation comprises acquiring lower bounds from as seen in FIG. 10 placing them such that the sequences are held and arranging the upper bounds such that the corresponding sequence is also held.

Summarizing the method described above, by generating a Markov chain out of a data set of sequencing constraints (describing a software system to be executed on the automation system and consisting of software components and runnables distributed over the number of computing nodes) and conducting a Monte Carlo simulation an optimization can be applied to describe possible time execution scenarios in a software project based on its architecture description and its component's layout. The method starts with a deduction of the Markov chain model from a factor graph of the software system. Thereby, manual modeling can be avoided allowing a quick and direct application of the method as explained above.

The Markov chain as well as the Monte Carlo optimization are a set of methods from the area of stochastic analysis to sample data from an unknown or partially known stochastic process and to efficiently estimate underlying models. These models can be used for inference or simulation purposes at a later phase. For this model identification measured data or data generated from a Markov process model can be used to fit the presumable model.

The Markov chain is generated from a data set of sequencing constraints and a communication matrix derived from a factor graph. The transition matrix generated from these two inputs has certain properties and is used to model sequences, runnable priorities and communication timing aspects. For each computing node, a scheduler is modeled with a constraint reach of stages. This means that a sub-matrix for that area cannot reach all other states.

With relative positioning constraints, the estimate timing layout of the problem can be described by annotating the runnables with an estimate of a transition probability a depicted graph can be transformed to several parallel running Markov chains (see FIGS. 4 and 7). The Monte Carlo simulation helps to predict the ensembles timing properties and allows infeasibility identification on worst case scenarios, scheduling bottlenecks, starvation of resources, leakage of resources and other.

Using different probability distribution annotations of the runnables can describe complex behaviors that can affect the scheduling and preemptive response of the system. Probability distributions may be, for example, a truncated normal distribution, a gamma distribution, a beta distribution or a uniform distribution. By assigning a gamma distribution to a runnable, it can be express that the execution time usually lays at a certain peak but due to, for example convergence criteria, the execution time might take a longer or shorter time than expected depending on the circumstances. By using a beta distribution, it can be described that the software component has a foreseeable distribution time which is usually at a certain peak. A uniform distribution is a bounded description of a stochastic process that can be applied, for instance the execution of a software component, where the number of operations is predictable and limited but might have some variance in operation time.

The characterization of each of the software components can be extended by means of other processes or deterministic descriptions of the time behavior, e.g. through a state space system model, Gaussian random walks, non-linear system description or other representations.

The ensemble of each software component determines how the system behaves as a whole. Based on the representation the model can be set up, and then be solved in a Monte Carlo simulation showing a result transition histogram, as seen in FIG. 9.

In order to identify bottlenecks in the architecture execution with respect to time issues, the timing, sequencing, concurrency constraints are used to setup the Markov chain Monte Carlo simulation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for computer-implemented configuration of an automation system by means of a processing unit of a computer system, the automation system having computing nodes configured to allocate resources to a software system in the computer system, the method comprising:
a) receiving, at the processing unit, a computer generated data set of sequencing constraints describing the software system to be executed on the automation system and comprising software components and runnable function entities distributed over the computing nodes as well as timing, sequencing and concurrency information of the runnable function entities;
b) generating, by the processing unit, a transition matrix from the computer generated data set of sequencing constraints, the transition matrix having a plurality of matrix elements each describing, by a transition value, a transition from a runnable function entity to another runnable function entity;
c) receiving, at the processing unit, a computer generated communication matrix describing communication links between the computing nodes in the automation system;
d) generating, by the processing unit, a Markov chain out of the computer generated data set of sequencing constraints and the computer generated communication matrix;
e) generating, by the processing unit, a distribution function from the Markov chain describing, for a specific timing distribution of the software components and runnable function entities, resources of the computing nodes to be allocated to the software components and the runnable function entities;
f) performing, by the processing unit, Monte Carlo simulations for different resources used by the runnable function entities and different execution times of the runnable function entities to output a graph of resources needed by the runnable function entities and to determine an optimum allocation of resources for the runnable function entities;
g) optimally allocating, by the processing unit in accordance with the optimum allocation of resources, the resources to the runnable function entities of the software system; and
h) executing, by the processing unit, the runnable function entities.

2. The method according to claim 1, wherein steps a) and c) are processed in parallel, followed by step b) succeeding step a).

3. The method according to claim 1, wherein the computer generated data set of sequencing constraints is generated from a factor graph representing the automation system as a unified graphical notation.

4. The method according to claim 1, wherein the computer generated data set of sequencing constraints comprises a description of an edge for each pair of runnable function entities.

5. The method according to claim 1, wherein the computer generated data set of sequencing constraints comprises, for each pair of the runnable function entities:
a direction of communication;
identifiers of the runnable function entity from which the communication originates and the runnable function entity which is the recipient of the communication;
an identifier of the signal of communication; and
the compute node or nodes which are involved in the communication.

6. The method according to claim 1, wherein the communication matrix describes a message exchange between the computing nodes along with the signals contained in messages.

7. The method according to claim 1, wherein, from the communication matrix, each of the runnable function entity are assigned to a specific computing node of the automation system.

8. The method according to claim 1, wherein the transition matrix is generated from the data set of sequencing constraints, where the communication matrix adds information which of the matrix elements belongs to which of the computing nodes.

9. The method according to claim 1, wherein the matrix elements of the transition matrix comprise an execution timing information representing a timing behavior of each runnable function entity.

10. The method according to claim 9, wherein a timing sequence diagram for each computing node is gained from the transition matrix.

11. The method according to claim 1, the method comprising:
  i) the Monte Carlo simulations enabling infeasibility identification on worst case scenarios, scheduling bottlenecks, starvation of resources, and leakage of resources.

12. A computer program unit, comprising a computer readable hardware storage device having computer readable program code stored therein, said program code executable by a processing unit of a computer system to implement a method, the method comprising:
  a) receiving, at the processing unit, a computer generated data set of sequencing constraints describing a software system to be executed on an automation system and comprising software components and runnable function entities distributed over a number of computing nodes as well as timing, sequencing and concurrency information of the runnable function entities, wherein the computer system comprises the software system;
  b) generating, by the processing unit, a transition matrix from the computer generated data set of sequencing constraints, the transition matrix having a plurality of matrix elements each describing, by a transition value, a transition from a runnable function entity to another runnable function entity;
  c) receiving, at the processing unit, a computer generated communication matrix describing communication links between the computing nodes in the automation system;
  d) generating, by the processing unit, a Markov chain out of the computer generated data set of sequencing constraints and the computer generated communication matrix;
  e) generating, by the processing unit, a distribution function from the Markov chain describing, for a specific timing distribution of the software components and runnable function entities, resources of the computing nodes to be allocated to the software components and the runnable function entities;
  f) performing, by the processing unit, Monte Carlo simulations for different resources used by the runnable function entities and different execution times of the runnable function entities to output a graph of resources needed by the runnable function entities and to determine an optimum allocation of resources for the runnable function entities;
  g) optimally allocating, by the processing unit in accordance with the optimum allocation of resources, the resources to the runnable function entities of the software system; and
  h) executing, by the processing unit, the runnable function entities.

13. The computer program unit according to claim 12, the method comprising:
  i) the Monte Carlo simulations enabling infeasibility identification on worst case scenarios, scheduling bottlenecks, starvation of resources, and leakage of resources.

14. A system for computer-implemented configuration of an automation system having computing nodes configured to allocate resources to a software system in a computer system, the system comprising a processing unit configured to:
  a) receive a computer generated data set of sequencing constraints describing the software system to be executed on the automation system and comprising software components and runnable function entities distributed over the computing nodes as well as timing, sequencing and concurrency information of the runnable function entities;
  b) generate a transition matrix from the computer generated data set of sequencing constraints, the transition matrix having a plurality of matrix elements each describing, by a transition value, a transition from a runnable function entity to another runnable function entity;
  c) receive a computer generated communication matrix describing communication links between the computing nodes in the automation system;
  d) generate a Markov chain out of the computer generated data set of sequencing constraints and the computer generated communication matrix;
  e) generate a distribution function from the Markov chain describing, for a specific timing distribution of the software components and runnable function entities, resources of the computing nodes to be allocated to the software components and runnable function entities;
  f) perform, Monte Carlo simulations for different resources used by the runnable function entities and different execution times of the runnable function entities to output a graph of resources needed by the runnable function entities and to determine an optimum allocation of resources for the runnable function entities; and
  g) optimally allocate, in accordance with the optimum allocation of resources, the resources to the runnable function entities of the software system; and
  h) execute the runnable function entities.

15. The system according to claim 14, the processing unit configured to:
  i) enable, via the Monte Carlo simulations, infeasibility identification on worst case scenarios, scheduling bottlenecks, starvation of resources, and leakage of resources.

* * * * *